March 5, 1957  E. P. RODEMANN  2,784,331
SYNCHRONOUS MOTOR
Filed March 22, 1954  2 Sheets-Sheet 1

INVENTOR.
EMMETT P. RODEMANN
BY
Ostrolenk and Faber
ATTORNEYS

March 5, 1957 E. P. RODEMANN 2,784,331
SYNCHRONOUS MOTOR
Filed March 22, 1954 2 Sheets-Sheet 2
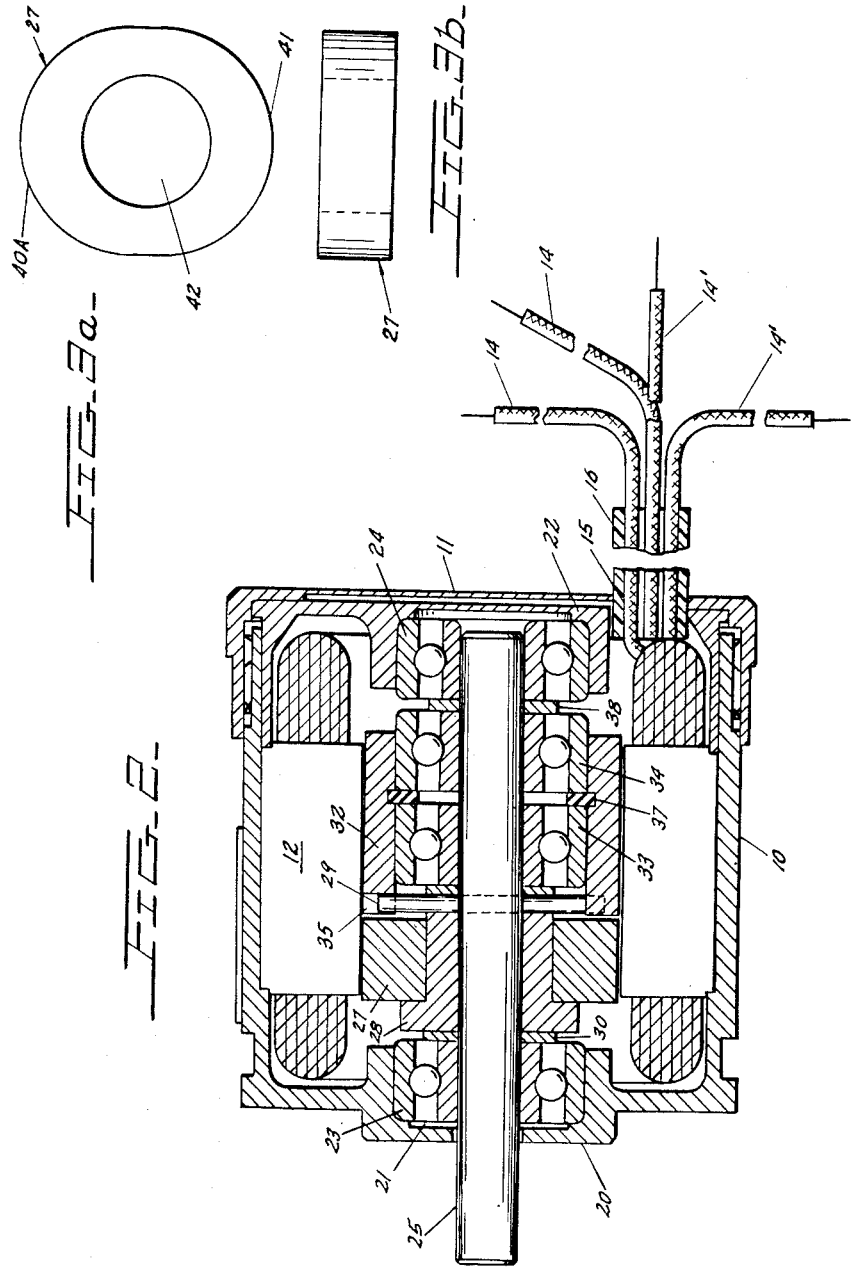
INVENTOR.
EMMETT P. RODEMANN
BY
Ostrolenk and Faber
ATTORNEYS

United States Patent Office 2,784,331
Patented Mar. 5, 1957

2,784,331

SYNCHRONOUS MOTOR

Emmett P. Rodemann, Garden City, N. Y., assignor to Kollsman Instrument Corporation, Elmhurst, N. Y., a corporation of New York Application March 22, 1954, Serial No. 417,549

4 Claims. (Cl. 310—162)

The present invention relates to single phase synchronous motors and more particularly to single phase synchronous motors of the self-starting type.

It is well known in the art that to make a single phase synchronous motor self-starting a shading coil is inserted in the stator pole faces. The rotor then comes up almost to synchronous speed with the field winding unexcited. When the field winding is energized, the rotor and stator fields are still not quite stationary with respect to each other but move at a slow relative speed equal to the slip speed due to induction motor action. At this point, synchronous torque still varies sinusoidally but at a very low frequency, equal to slip frequency. If the load and inertia are not too great, the positive half cycle of synchronous torque lasts long enough to raise the rotor speed from the slip speed to synchronous speed or in other words to pull the rotor into synchronism.

It is found, however, in critical cases that several successive positive half cycles are needed to cause the rotor to reach synchronous speed.

In small synchronous motors the exciting and the rotor field coils are replaced by a permanent magnet rotor. However, the synchronous torque of these small permanent-magnet-rotor-synchronous motors when started by auxiliary motors such as a damper coil still varies sinusoidally during the starting period at a low frequency equal to the slip frequency due to induction motor action.

It is also well-known that the phenomenon of hysteresis can be used to produce mechanical torque. The hysteresis phenomenon is thus used in so-called hysteresis motors. Hysteresis motors are self-starting and their starting action may be explained as follows:

When the rotor is stationary, the starting torque is produced in proportion to the product of the fundamental component of the stator M. M. F. and rotor flux and the sine of the torque angle. The rotor then accelerates if the counter torque of the load is less than the developed torque of the motor. As long as the load is turned at less than synchronous speed each particle of the hysteresis rotor is subjected to a repetitive hysteresis cycle at the slip frequency.

While the rotor accelerates, the lag angle remains constant if the flux is constant since the angle depends mainly upon the hysteresis loop of the rotor and is independent of the rate at which the loop is traversed.

The advantage of this motor is therefore that it develops constant torque right up to synchronous speed in contrast with a reluctance motor which must accelerate its load quickly into synchronism from an induction motor torque speed characteristic.

A hysteresis motor therefore can synchronize a load which it can accelerate, no matter how great the inertia.

The present invention combines the self-starting characteristics of hysteresis motors and the high degree of orientation afforded by the use of permant magnet motors.

Accordingly, one object of the present invention is the provision of starting means for synchronous motors which cause the rotor of the synchronous motor to reach synchronous speed without any of the disadvantages pointed out above for damper winding type starting means.

Still another object of the present invention is a synchronous motor having a high degree of orientation and self-starting properties.

The present invention provides an auxiliary hysteresis rotor for accelerating the main rotor to synchronous speed during the starting period so that the synchronous speed is quickly reached by the main rotor.

Furthermore, a unique rotor assembly operating within the conventional stator produces stable means of orientation where orientation as used herein means the relation between the fixed shaft position in reference to the rotating magnetic field vector generated by the A. C. supply.

Another object of the present invention is the provision of means for achieving stable means of orientation in a synchronous motor.

The main rotor assembly consists of a permanent magnet element so shaped that there is no abrupt change in the curvature at the small-air gap portion of the bore and thus provides a large concentration of flux to give a high degree of orientation.

Still another object of the present invention is therefore the provision of a rotor so shaped that it provides a large concentration of flux and therefore a high degree of orientation.

After the main rotor reaches synchronous speed, the auxiliary or starting element, which rotates about the main shaft but on a separate set of ball bearings within fixed angular limits, assumes a random position within this limited angle of rotation so as not to exert any torque on the main rotor.

A further object of the present invention is therefore the provision of means whereby the starting element does not exert any torque on the main rotor after synchronous speed is reached. The starting element serves in particular to provide a low reluctance magnetic path for the stator flux during the synchronous running phase of the main rotor.

The present invention consists of a synchronous motor having a conventional stator in which the rotor assembly is made up of two elements, each of which is a part of the rotor magnetic circuit. One of these elements also referred to as the main rotor is fixedly mounted on the shaft of the motor and is a permanent magnet. The other element is loosely coupled to the shaft so that it can rotate freely within definite limitations of angle on an additional set of ball bearings.

This second element is made of hysteresis material. The permanent magnet which is tightly coupled to the shaft serves to hold the rotor shaft in close alignment with the magnetic poles induced by the stator after synchronous speed has been reached.

It is in fact provided with a special contour salient rotor so as to give strong salient poles with no abrupt change in curvature at the small-air gap portion of the bore and thus gives a large concentration of flux to provide a high degree of orientation.

The auxiliary or hysteresis element functions only during the starting cycle to accelerate the rotor to synchronous speed.

During synchronous speed operation of the rotor, the hysteresis element takes a random position within the above-mentioned restricted angle of rotation.

The foregoing and many other objects of the present invention will become apparent when taken in connection with the accompanying drawings in which:

Figure 2 is an axial cross-sectional view of the synchronous motor of the present invention.

Figure 3a is an end view of the permanent magnet rotor of the present invention showing the particular contour which provides strong salient poles.

Figure 3b is a side view of the rotor of Figure 3a.

Figure 1:
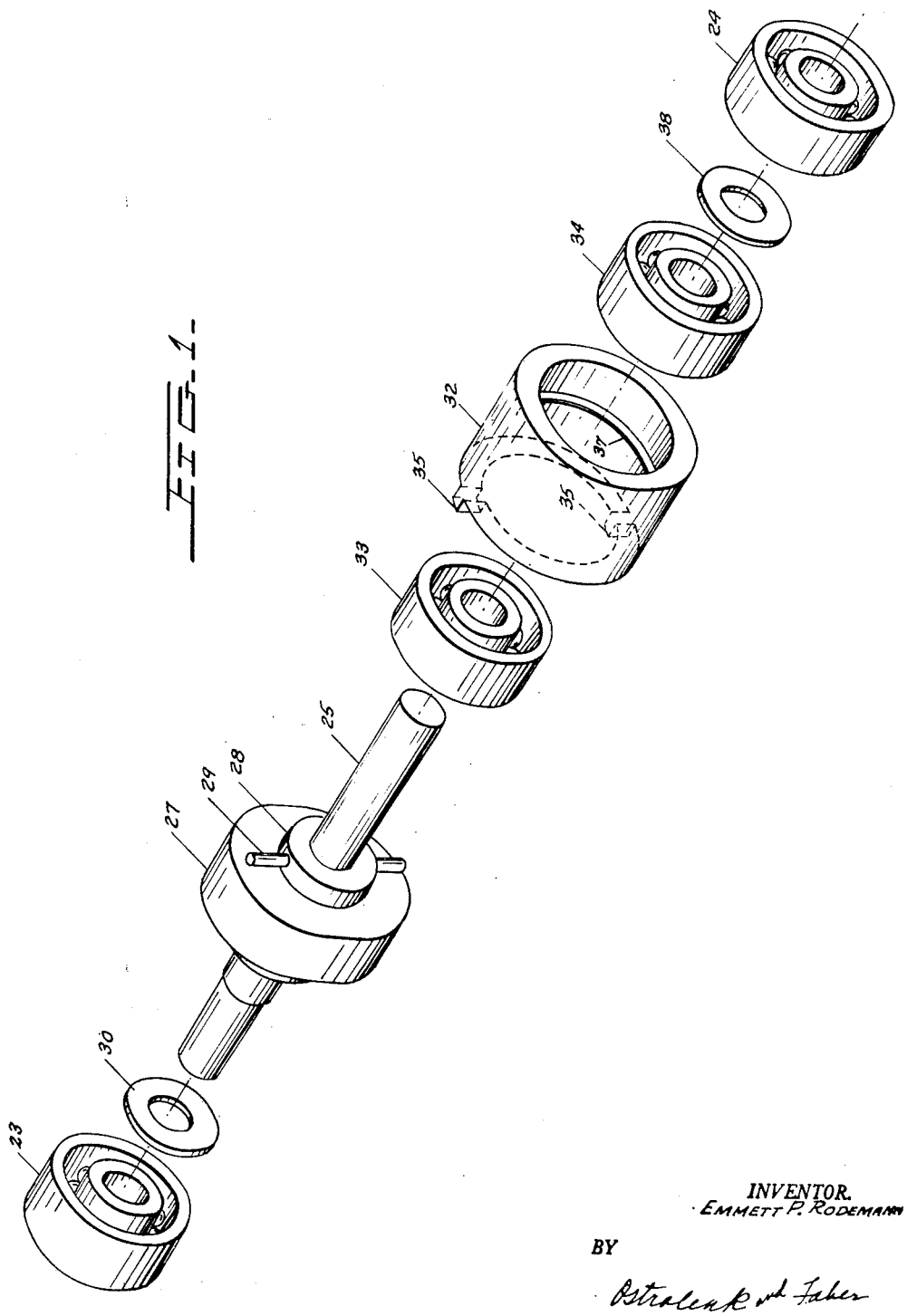
Figure 1 is an exploded view of the synchronous motor of the present invention showing the permanent magnet rotor and the hysteresis element.

Referring first to Figure 2, the motor of the present invention is enclosed in a housing 10 having a removable cover 11; mounted fixedly in the interior of the housing is a conventional polyphase stator 12.

The four terminal leads 14 of the stator 12 are brought outside the housing 10 through an opening 15 in cover 11 and an appropriate insulated cylinder 16 positioned in opening 15 of cover 11.

The bottom 20 of housing 10 and cover 11 are provided in the interior surfaces with appropriate recesses 21 and 22 respectively in which are positioned bearings 23 and 24 respectively for shaft 25 (see also Figure 1).

Shaft 25 carries the main permanent magnet (orienting) rotor 27 described in more detail hereinafter with reference to Figures 3a and 3b.

Actually the permanent magnet element 27 is mounted fixedly on a collar 28 clearly shown in Figure 2. Element 27 is rigidly fixed to shaft 25 by pin 29 which engages element 28 and shaft 25 through appropriate openings in element 28 and shaft 25. Separating the bearing 23 from the rotor element 28 is a spacer 30.

On the other side of shaft 25 with respect to rotor 27 is a hysteresis element 32. Hysteresis element 32 is a hollow cylinder which is mounted on shaft 25 through two additional bearings 33 and 34. In other words, bearings 33 and 34 are positioned on shaft 25 and hysteresis element 32 is mounted over bearings 33 and 34 so that hysteresis element 32 is free to rotate with respect to shaft 25.

Generally, hysteresis element 32 will not produce a torque on shaft 25. Hysteresis element 32, however, is provided with two axial extensions 35 for engagement with the two ends of pin 29 of rotor element 28 as described hereinafter.

Hysteresis element 32 is also provided with a snap ring 37 which separates the two bearings 33 and 34. Snap ring 37 serves to integrate the unit.

Spacer 38 serves to separate bearing 34 of hysteresis element 32 from bearing 24 of shaft 25.

Permanent magnet element 27 is shown more clearly in Figures 3a and 3b. In these figures, in fact, it is seen that permanent magnet element 27 has a special contour so that strong salient poles are provided without any abrupt change in curvature at the small-air gap portion of the bore (see also Figure 2).

The salient pole portions of permanent magnet element 27 are clearly seen at 40a and 41 in Figure 3a when contrasted with the central circular opening 42 through which permanent magnet element 27 is mounted on cylindrical element 28.

It is now possible to describe the operation of the synchronous motor of the present invention. After energization of the stator coils by the polyphase supply, the hysteresis element 32 through engagement of its extension 35 with pin 29 of permanent magnet element 27 accelerates rotor 27 to synchronous speed.

After reaching synchronous speed since the hysteresis element is loosely coupled by means of bearings 33 and 34 to shaft 25, it freely rotates within definite limitations of angle on an additional set of bearings 33 and 34.

The random magnetic poles that are normally induced in hysteresis element 32 do not affect the orientation of the main rotor 27 with respect to the stator field because of the freedom of angular position allowed by the loose coupling of hysteresis element 32 with respect to shaft 25 through bearings 33 and 34.

Permanent magnet element 27 is provided with salient poles 40a and 41 so that after synchronous speed has been reached it is in close alignment with the rotating magnetic poles induced by the stator 12.

It should be noted that stator 12 is connected to the polyphase A. C. supply (not shown) through its terminal leads 14', 14'.

Because of its shape, permanent magnet element 27 after reaching synchronous speed provides a large concentration of diametrical flux to thus give a high degree of orientation.

Therefore, the synchronous motor of the present invention obtains not only a very simple economical starting means but affords also a high degree of orientation of its rotor with respect to the stator field.

One of the applications for the orienting synchronous motor of the present invention is that of the driving means for a scanning device of the type disclosed in applications Serial No. 321,218, filed November 18, 1952, and Serial No. 321,696, filed November 20, 1952.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. An orienting self-starting synchronous motor comprising a polyphase stator member and a rotor member, said rotor member comprising a shaft, a hysteresis starting element floating on said shaft and a permanent magnet element fixed to said shaft, means for coupling said hysteresis element with said permanent magnet element for synchronously positioning the shaft of said rotor in a repeatable close mechanical reference to the rotating magnetic field vector produced by said stator, said permanent magnet element having an outside contour to provide two salient poles with no abrupt change in curvature between the poles thereby providing a large concentration of diametrical flux affording a high degree of orientation.

2. An orienting self-starting synchronous motor comprising a polyphase stator member and a rotor member, said rotor member comprising a shaft, a hysteresis starting element floating on said shaft and a permanent magnet element fixed to said shaft, means for coupling said hysteresis element with said permanent magnet element for synchronously positioning the shaft of said rotor in a repeatable close mechanical reference to the rotating magnetic field vector produced by said stator, a shaft drive pin for securing the permanent magnet element to the said rotor shaft, said hysteresis starting element engaging the said shaft drive pin during the starting cycle and accelertaing the said rotor member to synchronous speed until said permanent magnet fixed to said shaft takes over.

3. An orienting self-starting synchronous motor comprising a polyphase stator member and a rotor member, said rotor member comprising a shaft, a hysteresis starting element floating on said shaft and a permanent magnet element fixed to said shaft, means for coupling said hysteresis element with said permanent magnet element for synchronously positioning the shaft of said rotor in a repeatable close mechanical reference to the rotating magnetic field vector produced by said stator, said hysteresis starting element consisting of an annular sleeve having a high hysteretic content, a set of low friction bearings on said rotor shaft, said hysteresis starting element rotating about the said shaft on said set of low friction bearings within fixed limits of angle, said low friction bearings allowing this element to assume a random position within the said limited freedom of rotation during synchronous running without exerting any torque on the said rotor to pull the said rotor from its normal oriented position as preferred by the said permanent magnet element.

4. An orienting self-starting synchronous motor comprising a polyphase stator member and a rotor member, said rotor member comprising a shaft, a hysteresis starting element floating on said shaft and a permanent magnet element fixed to said shaft, means for coupling said hysteresis element with said permanent magnet element for synchronously positioning the shaft of said rotor in a repeatable close mechanical reference to the rotating magnetic field vector produced by said stator, said hysteresis starting element providing a low reluctance magnetic path for the stator flux during the synchronous running of the said rotor member.

References Cited in the file of this patent

UNITED STATES PATENTS 1,497,394    Warren _____ June 10, 1924

FOREIGN PATENTS 763,741    France _____ Feb. 19, 1934